United States Patent
Meschkat

(10) Patent No.: US 10,108,592 B1
(45) Date of Patent: Oct. 23, 2018

(54) METHODS AND SYSTEMS FOR CHUNKING MARKUP LANGUAGE DOCUMENTS CONTAINING STYLE RULES

(71) Applicant: Google Inc., Mountain View, CA (US)

(72) Inventor: Steffen Gerd Meschkat, Zurich (CH)

(73) Assignee: Google LLC, Mountain View, CA (US)

( * ) Notice: Subject to any disclaimer, the term of this patent is extended or adjusted under 35 U.S.C. 154(b) by 388 days.

(21) Appl. No.: 14/105,055

(22) Filed: Dec. 12, 2013

(51) Int. Cl.
*G06F 17/00* (2006.01)
*G06F 17/22* (2006.01)

(52) U.S. Cl.
CPC .............................. *G06F 17/2247* (2013.01)

(58) Field of Classification Search
CPC ...... G06F 17/24; G06F 17/25; G06F 17/2247; G06T 11/60; A63F 2300/5553; A63F 2300/6623
USPC ................. 715/201, 202, 230, 255
See application file for complete search history.

(56) References Cited

U.S. PATENT DOCUMENTS

| | | | | |
|---|---|---|---|---|
| 6,981,257 B2 * | 12/2005 | Teubner | .................. | G06F 9/541 709/203 |
| 8,413,047 B2 * | 4/2013 | Vick | ...................... | G06F 17/272 715/234 |
| 2002/0122054 A1 * | 9/2002 | Hind | .................. | G06F 17/30896 715/731 |
| 2002/0129024 A1 * | 9/2002 | Lee | ......................... | G06F 21/41 |
| 2004/0010755 A1 * | 1/2004 | Hamada | .................. | G06F 17/24 715/255 |
| 2009/0066722 A1 * | 3/2009 | Kriger | .................... | G06Q 30/02 345/619 |
| 2009/0070413 A1 * | 3/2009 | Priyadarshan | ...... | G06F 17/2247 709/203 |
| 2013/0080876 A1 * | 3/2013 | Freese | .................... | G06F 17/227 715/234 |
| 2013/0290180 A1 * | 10/2013 | Baffier | ..................... | G06F 8/61 705/40 |
| 2013/0339840 A1 * | 12/2013 | Jain | ..................... | G06F 17/2247 715/234 |
| 2014/0149844 A1 * | 5/2014 | Podjarny | ............. | G06F 17/2247 715/234 |

* cited by examiner

Primary Examiner — Andrew R Dyer
Assistant Examiner — Jenq-Kang Chu
(74) Attorney, Agent, or Firm — Morgan, Lewis & Bockius LLP

(57) ABSTRACT

Aspects of the subject technology relate to providing chunked markup language documents containing style rules. A computer-implemented method includes receiving a request for a web document. The method further includes selecting a template for the requested web document, where the template includes elements and style rules. The method further includes evaluating the elements in document order until reaching a first element containing a first expression referencing a first unspecified input parameter. The method further includes adding evaluated elements in the template that precede, in document order, the first element to a first set of elements. The method further includes identifying a first set of style rules based on the first set of elements. The method further includes providing the first set of elements and the first set of style rules as a first chunk of the requested web document for sending to the web client.

22 Claims, 6 Drawing Sheets

```
1   <html jstemplate="T; question: string; answer: string; answer_url: string;">
2   <head>
3   <style>
4   .question { font-weight: bold; }
5   .answer { font-weight: normal; }
6   a { color: gray; font-family: Calibri; }
7   </style>
8   </head>
9   <body>
10  <div class="question" jscontent="question">The question from the request</div>
11
12  <div jsif="answer != """>
13  <span class="answer" jscontent="answer">The answer returned from the backend</span>
14  <a jsif="answer_url != """ jsattrs="href:answer_url">More...</a>
15  </div>
16
17  <div jsif="answer == """>
18  <span class="answer">We don't know.</span>
19  </div>
20
21  </body>
22  </html>
```

505 — Receive a request for a web document

510 — Select a template for the requested web document, the template including a plurality of elements, where at least one element in the plurality of elements contains an expression referencing an input parameter, and a plurality of style rules for presenting the web document in a web client 515 — Evaluate the plurality of elements in document order until reaching a first element containing a first expression referencing a first unspecified input parameter 520 — Add evaluated elements in the template that precede, in document order, the first element containing the first expression referencing the first unspecified input parameter to a first set of elements 525 — Identify a first set of style rules from the plurality of style rules, where each style rule in the first set of style rules is associated with at least one element in the first set of elements 530 — Provide the first set of elements and the first set of style rules as a first chunk of the requested web document for sending to the web client

605 — Receive the first unspecified input parameter

610 — Evaluate the plurality of elements in document order, starting from the first element, until reaching a second element containing a second expression referencing a second unspecified input parameter

615 — Add evaluated elements in the template that start from the first element and precede, in document order, the second element containing the second expression referencing the second unspecified input parameter to a second set of elements

620 — Identify a second set of style rules from the plurality of style rules, where each style rule in the second set of style rules is associated with at least one element in the second set of elements

625 — Provide the second set of elements and the second set of style rules as a second chunk of the requested web document for sending to the web client

FIG. 6

METHODS AND SYSTEMS FOR CHUNKING MARKUP LANGUAGE DOCUMENTS CONTAINING STYLE RULES

BACKGROUND

The present disclosure relates generally to document processing and more particularly to methods and systems for chunking markup language documents containing style rules.

Web documents can be provided from one computing device to another computing device. For example, the web documents can be Hypertext Markup Language (HTML) documents that, when rendered by a web browser, display a web page. When a Hypertext Transfer Protocol (HTTP) server sends an HTML document to a web browser, the HTML document can be sent as multiple chunks. Upon receiving each chunk, the web browser can process the chunk and display portions of the web page associated with the chunk. Generally, transmission of HTML documents as chunks allows for a more efficient manner of transmitting the HTML documents relative to a case where the HTML documents are transmitted all at once.

SUMMARY

Aspects of the subject technology relate to a computer-implemented method. The method includes receiving a request for a web document. The method further includes selecting a template for the requested web document, where the template includes a plurality of elements and a plurality of style rules for presenting the web document in a web client. At least one element in the plurality of elements contains an expression referencing an input parameter. The method further includes evaluating the plurality of elements in document order until reaching a first element containing a first expression referencing a first unspecified input parameter. The method further includes adding evaluated elements in the template that precede, in document order, the first element containing the first expression referencing the first unspecified input parameter to a first set of elements. The method further includes identifying a first set of style rules from the plurality of style rules, where each style rule in the first set of style rules is associated with at least one element in the first set of elements. The method further includes providing the first set of elements and the first set of style rules as a first chunk of the requested web document for sending to the web client.

Aspects of the subject technology also relate to a non-transitory machine-readable medium including instructions stored therein, which when executed by a machine, cause the machine to perform operations. The operations include receiving a request for a web document. The operations further include selecting a template for the requested web document, where the template includes a plurality of elements and a plurality of style rules for presenting the web document in a web client. At least one element in the plurality of elements contains an expression referencing an input parameter. The operations further include evaluating the plurality of elements in document order until reaching a first element containing a first expression referencing a first unspecified input parameter. The operations further include adding evaluated elements in the template that precede, in document order, the first element containing the first expression referencing the first unspecified input parameter to a first set of elements. The operations further include identifying a first set of style rules from the plurality of style rules based on the first set of elements. The operations further include providing the first set of elements and the first set of style rules as a first chunk of the requested web document for sending to the web client.

Aspects of the subject technology also relate to a system. The system includes one or more processors and a non-transitory computer-readable medium comprising instructions stored therein, which, when executed by the one or more processors, cause the one or more processors to perform operations. The operations include receiving request for a web document. The operations further include selecting a template for the requested web document, where the template includes a plurality of elements and a plurality of style rules for presenting the web document in a web client. At least one element in the plurality of elements containing an expression referencing an input parameter. The operations further include evaluating the plurality of elements in document order. The operations further include stopping the evaluating upon reaching a first element containing a first expression referencing a first unspecified input parameter. The operations further include adding evaluated elements in the template that precede, in document order, the first element containing the first expression referencing the first unspecified input parameter to a first set of elements. The operations further include identifying a first set of style rules from the plurality of style rules, wherein each style rule in the first set of style rules is associated with at least one element in the first set of elements. The operations further include providing the first set of elements and the first set of style rules as a first chunk of the requested web document for sending to the web client.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

FIG. 4 shows an example template.

FIG. 5 is a flowchart illustrating an example process for providing a chunk to a web client, in accordance with one or more implementations.

FIG. 6 is a flowchart illustrating an example process for providing a second (or subsequent) chunk to the web client, in accordance with one or more implementations.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

In accordance with one or more implementations, methods and systems for providing chunked markup language documents that contain style rules are described. In one or more implementations, the markup language documents are sent as multiple chunks, with chunk boundaries being dynamically determined based on processing of a template for the markup language documents.

A template as used herein refers to a markup language document that contains at least one template processing (data binding) instruction and at least one style rule. Although for discussion purposes HyperText Markup Language (HTML) will be utilized as the markup language, the subject technology can be utilized with other markup languages such as Extensible HyperText Markup Language (XHTML) and Extensible Markup Language (XML), among other markup languages identifiable by a person skilled in the art. An example style rule utilized for discussion purposes is a Cascading Style Sheet (CSS) rule.

Figure 1:
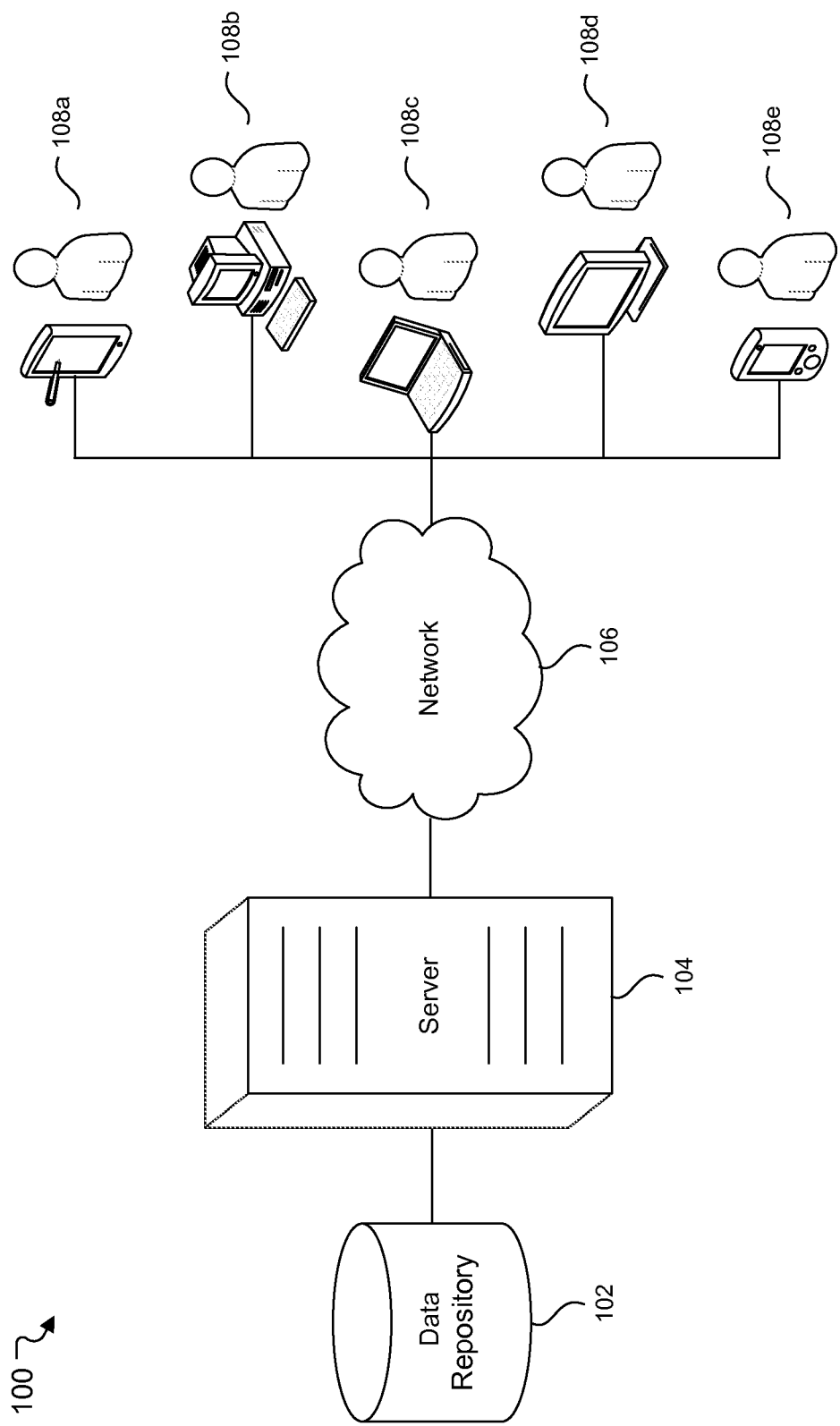
FIG. 1 illustrates an example network environment with which some implementations of the subject technology can be implemented.

FIG. 1 illustrates an example network environment 100 with which some implementations of the subject technology can be implemented. Network environment 100 includes a data repository 102 (e.g., computer-readable storage media) for storing a variety of data accessible by web-based applications. While the network environment 100 includes a single data repository 102 in FIG. 1, the network environment 100 may include additional data repositories in some implementations. Data repository 102 may store, for example, web documents associated with web pages, including templates for template processing, content to be displayed in web pages, and so forth.

Network environment 100 further includes server 104. In some example aspects, server 104 can be a single computing device, for example, a computer server. In other embodiments, server 104 can represent more than one computing device working together to perform the actions of a server (e.g., server farm).

Client devices 108a-108e represents various forms of processing devices. Examples of a processing device include a desktop computer, a laptop computer, a handheld computer, a television coupled to a processor or having a processor embedded therein, a personal digital assistant (PDA), a network appliance, a camera, a smart phone, a media player, a navigation device, an email device, a game console, or a combination of any of these data processing devices or other data processing devices.

Each of client devices 108a-108e may be any system or device having a processor, a memory, and communications capability. Further, each of client devices 108a-108e can represent various forms of servers including, but not limited to a web server, an application server, a proxy server, a network server, or a server farm. In some aspects, client devices 108a-108e may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

Server 104 and client devices 108a-108e may be communicatively coupled through a network 106. In some implementations, client devices 108a-108e may request data from server 104. For example, a client device (e.g., 108a) may request server 104 to provide a web document to a web browser of the client device, for which server 104 retrieves and sends the web page. In some aspects, network environment 100 can be a distributed client/server system that spans one or more networks such as network 106. Network 106 can be a large computer network, including a local area network (LAN), wide area network (WAN), the Internet, a cellular network, or a combination thereof connecting any number of mobile clients, fixed clients, and servers. In some aspects, each client (e.g., client devices 108a-108e) can communicate with servers 104 via a virtual private network (VPN), Secure Shell (SSH) tunnel, or other secure network connection. In some aspects, network 106 may further include a corporate network (e.g., intranet) and one or more wireless access points.

In example aspects, server 104 may process a template to generate a web document or portion thereof to be sent to a client device 108a-108e. In one or more implementations, the web document, when rendered by a web browser, displays a web page on a client device 108a-108e (e.g., a monitor of the client device). For example, server 104 may receive a request from a client device 108a-108e for a web document. In some implementations, server 104 may receive, along with the request, additional input parameter(s) provided by the client device 108a-108e. Based on the web document associated with the request, server 104 can select a template associated with the web document from data repository 102. Server 104 can process the template based on the additional input parameter(s) and store results of the processing (e.g., results of evaluated statements) in data repository 102. In one or more implementations, server 104 can send the web document or a portion thereof to the client device 108a-108e prior to having processed an entirety of the template.

Figure 2:
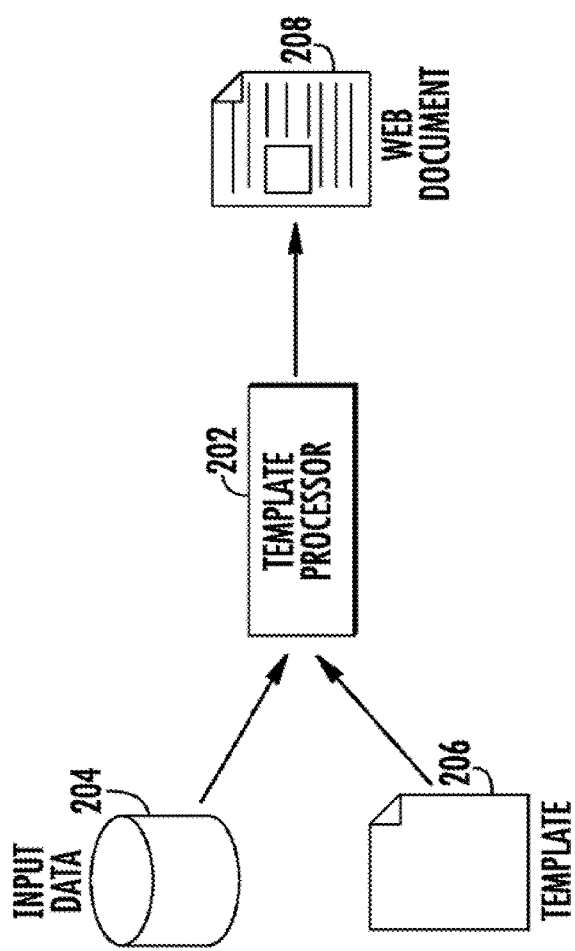
FIG. 2 depicts an example of utilizing template processing to generate a web document.

FIG. 2 depicts an example of utilizing template processing to generate a web document. In one or more implementations, web documents may be dynamically constructed using template processing. Template processing generally includes merging a data set (e.g., a collection of data parameters) with a structured template to produce a web document, such as an HTML document. The data set is merged with the template by template processing instructions in the template. The template processing instructions may be operational to bind the data set to the template. In various aspects, template processing may be implemented by a web server (e.g., server 104 in FIG. 1) to generate a web document or a portion of the web document for a client device (e.g., 108a-108e in FIG. 1).

As shown, a template processor 202 may receive input data 204 and a template 206. The template processor 202 may be configured to bind or merge the input data 204 to the template 206 to generate a web document 208. In some implementations, the template processor 202 is contained in a server (e.g., 104 in FIG. 1) that processes the template 206 to generate data associated with the web page and provides, for transmission, the data to a client device (e.g., 108a-108e in FIG. 1). In some implementations, the server communicates with a template processor that is not considered part of the server. In some implementations, when processed by a web client (e.g., web browser), the web document 208 can provide information associated with a web page or portion thereof.

Input data 204 includes one or more input parameters to be presented in the web document 208. Input data 204 may be defined in a data structure and may include one or more types of data, such as simple data and/or one or more data objects. The data objects may be specified using a programming language (e.g. JavaScript). In some configurations, the binding of the input data 204 to the template 206 allows for content in a web page or portion thereof that depends on input from a user of the web browser. In some configurations, the content provided or displayed on the web page to the user is dependent upon the input provided by the user.

In some configurations, the template 206 allows for content of the web page to be provided or displayed (e.g., on a screen of a client device) in an order prescribed by the template 206. The template 206 may be processed in connection with template processing instructions in the template 206 that tell the template processor 202 how to bind input data 204 to the template 206. The template processing instructions may involve simple variable substitution or may involve computations such as evaluating expressions (e.g., conditional expressions). As used herein, the terms "template processing instructions" and "data binding instructions" are used interchangeably.

Furthermore, template 206 can contain style rules, such as Cascading Style Sheet (CSS) rules, that provide instructions that specify how to present or layout the data in the web document 208. For example, the style rules may specify fonts, colors, paragraph layout, tables, lists, sections, image locations, image sizes, and so forth within the web document 208. The CSS rules may be in any suitable format, such as HTML format.

An element in a template can include a variable declaration, an expression (e.g., conditional expression), template processing instruction, style rule, various other instructions (e.g., a loop), or a combination thereof. Each element has a start tag, an end tag, and content related to the element (e.g., element content between the start and end tags of the element). For example, a line that reads "<head>" in an HTML document is making reference to the "head" element of the HTML document.

Figure 3:
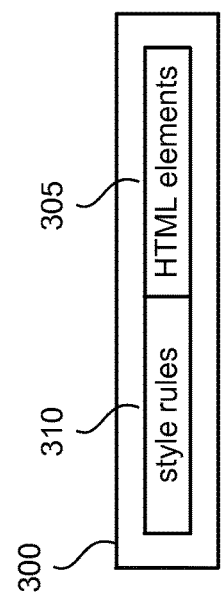
FIG. 3 illustrates an example chunk of data that is associated with a web document, in accordance with one or more implementations of the subject technology.

FIG. 3 illustrates an example chunk 300 of data that is associated with a web document, in accordance with one or more implementations of the subject technology. The example chunk 300 includes HTML elements 305 and style rules 310 associated with the HTML elements 305. Specifically, each style rule in the style rules 310 is to be applied to one or more elements in the HTML elements 305. In one or more implementations, the chunk 300 is associated with a web document that, when rendered by a web browser, displays a web page. The style rules 310 provide instructions that specify how to present or layout the HTML elements 305 in the web page.

In accordance with one or more implementations of the subject technology, methods and systems for providing chunked markup language documents that contain style rules are provided herein. A markup language document is sent in multiple chunks, with chunk boundaries being dynamically determined as a template (e.g., 206 in FIG. 2) is processed. As will be discussed, in one or more implementations, the template is processed by evaluating each line of the template in document order. The template includes at least one template processing instruction for binding input data (e.g., 204 in FIG. 2) to the template.

In one or more implementations, processing of the template is stopped when a chunk boundary is reached. A chunk boundary is reached upon reaching a template processing instruction that depends on an input parameter that is unspecified (e.g., has not yet been received). A chunk of a resulting web document (e.g., 208 in FIG. 2) associated with the processed portions of the template is built. Once built, the chunk is generally provided, for transmission, to a client device that requested the web document. The template is further processed upon receiving the input parameter that was previously unspecified.

Evaluating of elements in the template can be performed in document order until reaching a first element containing an expression that references an unspecified input parameter. As soon as the first element containing the expression is reached, a chunk can be built from the evaluated elements that precede the first element and provided to the client device (e.g., to be rendered by a web browser and displayed on a screen of the client device). In contrast, in cases with static chunk boundaries, also referred to as predefined chunk boundaries, data (e.g., elements, style rules) to be included in each chunk is predefined. Specifically, even though the evaluated elements are ready to be provided to the client, the static chunk boundaries impose that all elements within a predefined chunk be evaluated prior to transmission to the client. In some cases, therefore, utilizing dynamic chunk boundaries can allow for transmission of a chunk (e.g., first chunk) to the client device sooner than in the case utilizing static chunk boundaries.

Additionally, by providing style rules in a chunk that apply to elements within the same chunk, transmission of the markup language document is generally more efficient than a case where the style rules are transmitted to the client device without regard to whether the style rules are needed for a particular instance of processing the template. For instance, in some cases, the style rules may be in a header of a template (e.g., in a "style" element in the template). The style rules may be transmitted in one or more chunks prior to transmitting processed portions of the body of the template. In this case, some of the style rules may not need to be provided in any chunk because, for a given instance of processing the template, conditional expressions associated with the HTML elements to which the style rules pertain evaluate as false. An additional amount of data is sent in this case even though the additional data (e.g., the style rules) is not needed for this given instance.

In many instances of processing the template, utilizing dynamic chunk boundaries to provide the markup language document can allow for more efficient transmission of the markup language document to the client device, such as relative to a case with static chunk boundaries and/or style rules provided without regard to whether a given style rule is needed for a particular instance of processing the template. The transmission can be considered more efficient in terms of amount of data that needs to be provided to the web client and time involved in the transmission. Differences in efficiency between utilizing dynamic chunk boundaries compared to other cases generally differ with each instance of processing the template. For example, the differences are dependent on when each input parameter becomes specified and results of evaluating the expressions in the template (e.g., conditional expressions).

FIG. 4 shows an example template 400. Lines 1-22 of the template 400 are labeled to facilitate discussion. Those of ordinary skill in the art, using the disclosure provided herein, should understand that the template 400 may include any number of lines of varying complexity. As previously indicated, although for discussion purposes HTML will be utilized as the markup language, the subject technology can utilize other markup languages.

The template 400 starts with a "jstemplate" processing instruction presented in the format "jstemplate=<name of the template>; <parameter name>: <parameter type>". In particular, line 1 defines "T" as a name for the template (e.g., to be used when a template instance is created). The template includes three input parameters (e.g., "question", "answer", and "answer_url", and each of the three input parameters is a string. It is noted that in one or more implementations the number of input parameters associated with the template can be fewer or more than that shown in the example of FIG. 4, and that the types of the input parameters can be different from one another. As used herein, the terms "input parameter" and "template parameter" are used interchangeably.

The template 400 includes style rules between start tag <style> and end tag </style> (e.g., lines 3-7). The number of styles rules associated with the template can be fewer or more than that shown in the example of FIG. 4. It is noted that, with reference to line 2-8, the "head" element is considered an ancestor element of the "style" element, since the "style" element is embedded in or contained within the "head" element. Similarly, the "style" element can be referred to as a descendant element of the "head" element.

The style rules shown in the template 400 are CSS rules. A CSS rule has two parts: a selector and one or more declarations. Each declaration has a property and a value associated with the property. For example, in line 6 of template 400, the selector "a" provides the HTML element (in this case, the "a" element) that is associated with the CSS rule. Any "a" element in the template 400 is to be styled by the CSS rule in the manner specified by the two declarations. The declarations include two properties (color and font-family) and their associated values (gray and Calibri, respectively). Based on this CSS rule, element content associated with any "a" element in the template 400 would be presented as gray, Calibri text.

Although implementations of the subject technology can include style rules between start tag <style> and end tag </style> in a template (e.g., template 400), the style rules can be provided in an external style sheet that is separate from the template. The external style sheet can be linked to the template. For example, the external style sheet can be linked to the template by a "link" element in the template that references the external style sheet. The style rules also can be provided in more than one external style sheet, where the external style sheets are each linked to the template.

Accordingly, a template that includes style rules can contain the style rules in the template itself, such as between start tag <style> and end tag </style> as shown in FIG. 4 for example. A template that includes style rules can contain the style rules in one or more external style sheets that are linked to the template. Furthermore, the style rules can be provided in a combination of external style sheets as well as style rules in the template itself. In any implementation, any external style sheet linked to the template is generally inlined into the template prior to or at processing time of the template.

FIG. 5 is a flowchart illustrating an example process 500 for providing a chunk to a web client (e.g., web browser), in accordance with one or more implementations. The example process 500 will be discussed with reference to the template 400 of FIG. 4. As previously indicated with reference to FIG. 3, the chunk can contain information for a portion of a web document associated with a web page, including elements and style rules to be applied to the elements. The blocks of FIG. 5 do not need to be performed in the order shown. It is understood that the depicted order is an illustration of one or more example approaches, and are not meant to be limited to the specific order or hierarchy presented. The blocks may be rearranged, and/or two or more of the blocks may be performed simultaneously.

According to one or more implementations, one or more blocks of FIG. 5 may be executed by a server (e.g., 104 in FIG. 1) and/or other computing devices of the subject technology in response to a request from a client device (e.g., 108a-108e in FIG. 1). Similarly, a non-transitory machine-readable medium may include machine-executable instructions thereon that, when executed by a computer or machine, perform the blocks of FIG. 5. The template 400 can be processed by a template processor in the server (e.g., 104 in FIG. 1). The template 400 is generally processed in document order (e.g., starting from a beginning of the template 400 to an end of the template 400).

As the template 400 is processed, a template processing instruction involving an input parameter (e.g., "question", "answer", "answer_url") may be reached prior to receiving a value for the input parameter. In accordance with one or more implementations, when a template processing instruction is reached that refers to a input parameter that has not been specified yet, a chunk of a requested web document is built and can be provided for transmission to the client device. Accordingly, each template processing instruction is a potential dynamic chunk boundary. In one or more implementations, the chunk boundaries are considered to be dynamic because actual chunk boundaries depend on considerations involving the processing of the template 400, which will be discussed in detail below. For example, each template instance of the template T that is processed can have different chunk boundaries. By providing multiple chunks for the web document, the client device can begin to render the web document and display a portion of a web page associated with the web document as opposed to waiting for an entire web document to be received.

For discussion purposes, consider that the input parameter "question" is provided by a user. For instance, the input parameter "question" may be provided by the user with the request for a web page. Accordingly, since the input parameter "question" is available when the template 400 is processed, the input parameter "question" would generally not be considered a potential dynamic chunk boundary.

With reference to FIG. 5, in block 505, a request from a web client (e.g., web browser) on a first computing device (e.g., one of client device 108a-108e in FIG. 1) for a web document is received by second computing device (e.g., server 104 in FIG. 1). In accordance with one or more implementations, the web client provides a request for the second computing device to send a web page to the web client. The first computing device can provide one or more parameters (e.g., input parameters) that, along with a template (e.g., 206 in FIG. 2), may be utilized by a template processor (e.g., 202 in FIG. 2) to generate a web document (e.g., 208 in FIG. 2).

In block 510, a template associated with the requested web document is selected. For example, a particular web document may have metadata (e.g., an identifier) that identifies the template to be selected in a case when the particular web document is being requested. In particular, for purposes of discussion, the selected template is the template 400 shown in FIG. 4. In accordance with one or more implementations, the template 400 includes elements, where at least one of these elements contains an expression referencing an input parameter. For instance, in line 14, the "a" element references input parameter "answer_url". The template 400 also includes style rules (e.g., lines 4-6) for presenting the web document in the web client. As previously indicated, a style rule is considered to be associated with an element if the style rule might be applied to the element dependent on results of the processing of the template 400. With reference to the template 400, the style rule in line 6 is associated with the element "a" in line 14.

In one example, the template 400 can be retrieved by the second computing device from memory within the second computing device. As another example, the template 400 can be retrieved by the second computing device from another computing device. The second computing device may contain a template processor (e.g., 202 in FIG. 2) for processing the template 400. Alternatively, the second computing device communicates with a template processor that is not considered part of the second computing device.

In block 515, the elements in the template 400 are evaluated in document order until a first element containing a first expression that references a first unspecified input parameter is reached. For purposes of discussion, consider that the "answer" parameter in line 12 is unspecified, where the "answer" is needed to evaluate the expression "answer !=""". As previously indicated, the "question" parameter, which is associated with line 10, is assumed to be provided by the client device along with the request, such as in block 505.

In one or more implementations, evaluation of an element in the template 400 includes determining whether an input parameter is associated with the element and, if an input parameter is associated with the element, determining whether the input parameter is specified (e.g., has been received) or unspecified. If the input parameter is specified, further evaluation of the elements in the template 400 can be performed. If the input parameter is unspecified, then an element containing an expression that references an unspecified input parameter has been reached.

An input parameter is associated with an element when the element contains an instruction (e.g., an expression) involving the input parameter. For example, the element may contain a template processing instruction that generates a result based on an input parameter. With reference to the template 400, the "answer_url" parameter is associated with the element "a" in line 14, which contains an instruction to evaluate conditional expression "a jsif="answer_url !""".

In one or more implementations, the parameter that is unspecified is an input parameter for which information has been requested (e.g., information requested from a server by the second computing device) but has not yet been received. Upon reaching a line in the template 400 that involves such a parameter, the processing of the template 400 is paused or stopped. In one or more implementations, a template processor that is processing the template 400 stops processing the template 400 while the template processor waits to receive the currently missing parameter. Results of the evaluated expressions are stored but no output is provided yet to the first computing device.

For example, based on the "question" parameter provided by the first computing device along with the request, the second computing device requests for the input parameters "answer" and "answer_url". In this case, values of "answer" and "answer_url" depend on value of "question". In one or more implementations, the second computing device can retrieve information pertaining to some or all of the input parameters from memory in the second computing device. Alternatively or in conjunction, the second computing device may request one or more input parameters from other computing devices. For example, these other computing devices may include one or more backend servers that have some or all of the requested parameters. Some of the requested input parameters can be retrieved from the second computing device whereas other requested parameters may be found in other computing devices.

In block 520, evaluated elements in the template 400 that precede, in document order, the first element containing the first expression referencing the first unspecified input parameter are added to a first set of elements. With reference to FIG. 4, the first set of elements includes the "div" element in line 10, which is an element that has been evaluated in block 515.

In one or more implementations, in block 515, evaluation of an element in the template 400 can include determining whether the element contains a conditional expression. In block 520, elements that contain a conditional expression that evaluated as true are added to the first set of elements. In contrast, an element associated with a conditional expression that evaluates as false is not included in the first set of elements. In line 12 of the template 400, for instance, if the conditional expression evaluates to false, then the "div" element that spans lines 12-15 are not added to the first set of elements.

In block 525, for the processed portion of the template 400, a first set of style rules is identified. The style rules can be identified based on the first set of elements. For instance, in one or more implementations, each style rule in the first set of style rules is associated with at least one element in the first set of elements. With reference to FIG. 4, line 10 has been evaluated. Accordingly, the first set of style rules includes the style rule in line 4, which is associated with the "div" element in line 10.

In one or more implementations, the identifying of the first set of style rules can include, for each style rule in the template 400, determining whether the style rule is associated with at least one element in the first set of elements. The style rule is added to the first set of style rules if the style rule is determined to be associated with at least one element in the first set of elements.

The first set of style rules generally includes those style rules that are to be applied to an associated element or elements in the first set of elements. In some cases, a style rule may be associated with an evaluated expression that evaluates as false (e.g., a conditional expression) and accordingly is not to be applied to the element or elements associated with the evaluated expressions. In cases where such a style rule is not to be applied, the style rule is not included in the first set of style rules. In one or more implementations, a style rule may be associated with an evaluated expression that evaluates as true (e.g., a conditional expression) and accordingly is to be applied. Such a style rule is included in the first set of style rules.

In block 530, the first set of elements and the first set of style rules are provided as a first chunk of the requested web document for sending to the web client of the first computing device. With reference to FIG. 4, the "div" element in line 10 and the associated style rule in line 4 are included in the first chunk. The first chunk can include results of the evaluated expressions associated with the elements in the first set of elements and the style rules in the first set of style rules. In one or more implementations, upon receipt of the first chunk, the web client of the first computing device can process the first chunk of the requested web document and render the first chunk to display a portion of a web page to a user of the first computing device.

FIG. 6 is a flowchart illustrating an example process 600 for providing a second (and subsequent) chunk to the web client (e.g., web browser), in accordance with one or more implementations. The blocks of FIG. 6 do not need to be performed in the order shown. It is understood that the depicted order is an illustration of one or more example approaches, and are not meant to be limited to the specific order or hierarchy presented. The blocks may be rearranged, and/or two or more of the blocks may be performed simultaneously. In one or more implementations, the process 600 in FIG. 6 can be utilized in conjunction with the process 500 in FIG. 5.

According to one or more implementations, one or more blocks of FIG. 6 may be executed by server (e.g., 104 in FIG. 1) and/or other computing devices of the subject technology in response to a request from a client device (e.g., 108*a*-108*e* in FIG. 1). Similarly, a non-transitory machine-readable medium may include machine-executable instructions thereon that, when executed by a computer or machine, perform the blocks of FIG. 6. In discussing the process 600 in FIG. 6, continued reference will be made to the template 400 in FIG. 4.

In block 605, an input parameter that was previously unspecified (e.g., the first unspecified input parameter in block 515 of FIG. 5) is received. With continued reference to FIG. 4, the "answer" parameter is received.

In block 610, starting from the first element in the template 400 containing an expression referencing the previously unspecified input parameter, the elements in the template 400 are evaluated in document order until a second element containing a second expression referencing a second unspecified input parameter is reached.

With continued reference to FIG. 4, line 12 is evaluated with the received "answer" parameter. In particular, the "answer !=""" is a conditional expression that compares value of the "answer" parameter to an empty string and returns a Boolean value of true if the value is not the empty string and false if the value is the empty string. If line 12 evaluates to false, lines 13-14 will generally not be evaluated. Consider that the value of the "answer" parameter is not an empty string and that, when line 14 is reached, the "answer_url" parameter is unspecified.

In block 615, evaluated elements in the template that start from the first element and precede, in document order, the second element containing the second expression referencing the second unspecified input parameter are added to a second set of elements. With reference to FIG. 4, the second set of elements includes the "div" element and the "span" element in lines 12 and 13, respectively.

In block 620, for the portion of the template 400 processed in block 610, a second set of style rules is identified. The style rules can be identified based on the second set of elements. In one or more implementations, each style rule in the second set of style rules is associated with at least one element in the second set of elements. With reference to FIG. 4, the second set of style rules includes the style rule in line 5.

In one or more implementations, the first set of style rules is disjoint from the second set of style rules. In other words, the style rules that have previously been provided in a previous chunk (e.g., a first chunk) need not be provided again to avoid redundancy of sending the same style rules. In these implementations, these style rules are generally not included in the second set of style rules.

In block 625, the second set of elements and the second set of style rules are provided as a second chunk of the requested web document for sending to the web client of the first computing device. With reference to FIG. 4, the "div" element in line 12, the "span" element in line 13, and the associated style rule in line 5 are included in the second chunk. In one or more implementations, the second chunk can include results of the evaluated expressions associated with the elements in the second set of elements and the style rules in the second set of style rules. Upon receipt of the second chunk, the web client of the first computing device can process the second chunk and render the second chunk to display a portion of the web page to the user of the first computing device.

In one or more implementations, each style rule has a corresponding flag. With reference to FIGS. 4-6, once a style rule is identified as a style rule in the first set of style rules, the identified style rule can have a corresponding flag set to a first value. Subsequently, prior to identifying a second set of style rules in block 620 of FIG. 6, each style rule in the first set of style rules can have a corresponding flag set from the first value to a second value. For each style rule in the template 400, the identifying of the second set of style rules can include determining whether the style rule has a corresponding flag set to a value different from the second value. If the style rule is determined to have a corresponding flag set to a value different from the second value, a determination can be made regarding whether the style rule is associated with at least one element in the second set of elements and, if so, the style rule can be added to the second set of style rules and a corresponding flag of the style rule can be set to the first value. Specifically, in the example above, style rules with a corresponding flag set to the second value are those style rules that have been previously provided in a chunk.

In one or more implementations, the first set of style rules is disjoint from the second set of style rules, where the identification of the different sets of style rules is based on value of the flags corresponding to the style rules. Accordingly, style rules that have been provided in a previous chunk are not provided again (e.g., to avoid redundancy of sending the same style rules). In any implementation, actual value or values for the first value and the second value are predetermined and are generally arbitrary. In the case of a binary flag, the first value can be 0 and the second value can be 1, or vice versa. In other cases, the first value can be any arbitrary value or arbitrary range of values and the second value can likewise be any arbitrary value or arbitrary range of values so long as the second value is different from the first value.

In one or more implementations, each of blocks 605, 610, 615, 620, and 625 is iterated until an entirety of the template 400 is processed. With reference to FIG. 4, the "answer_url" parameter is received and the remaining parts of the template 400 are processed to build a third chunk that is provided for transmission. If line 14 evaluates to true (e.g., value of "answer_url" is not an empty string), the style rule in line 6 will be provided as part of the third chunk. Otherwise, if line 14 evaluates to false, the style rule in line 6 will not need to be contained as part of the third chunk or any subsequent chunk, since no other lines are associated with the style rule in line 6. It is noted that, in contrast to the style rule in line 6, the style rule in line 5 will be contained in one of the chunks, since one of lines 12 and 17 must evaluate to true.

Since the template 400 has no remaining potential unspecified parameters and thus no remaining potential chunk boundaries, the entirety of the template 400 is processed and the resulting web page will have been provided as three chunks to the web client in the above example. In one or more implementations, each chunk is sent to the web client after each chunk is built, as opposed to storing the chunks and sending all three chunks at once.

In some implementations, once the entirety of the template 400 is processed, the request from the web client (e.g., as provided in block 505 in FIG. 5) is fulfilled. Portions of the web page can be displayed on the web client of the first computing device as each chunk is received by the web client. The web client can store received chunks and display portions of the web page in the web client once some or all of the chunks have been received.

As described with reference to FIGS. 4-6, the dynamic chunk boundaries for the chunks provided in block 530 in FIG. 5 and in block 625 in FIG. 6 are determined by the input parameters. In accordance with one or more implementations, potential chunk boundaries can include an element containing an expression referencing an unspecified input parameter. The element can carry a first template processing instruction associated with the input parameter.

Using FIG. 4 as an example, in one or more implementations, line 12 can be considered a potential chunk boundary since line 12 contains a first template processing instruction, in document order, associated with the "answer" parameter. In these implementations, line 17, which contains a subsequent template processing instruction associated with the "answer" parameter, is generally not considered a potential chunk boundary since a value for the "answer" parameter will have been received in the processing/evaluating of line 12 prior to moving on to processing subsequent lines in the template 400. Additionally, the "question" parameter in this example is assumed to be provided by the client device along with the request in block 505 and therefore has no latency associated with retrieving a value for the "question" parameter. Accordingly, in this example, line 10, which contains a first template processing instruction associated with the "question" parameter, would generally not be considered a potential chunk boundary.

In the example above, in one or more implementations, a first template processing instruction associated with the "answer" and "answer_url" parameters is considered a potential dynamic chunk boundary. With continued reference to FIG. 4, consider that line 12 evaluates to false instead of true. In such a case, lines 13-14 are generally not evaluated, and whether or not a value of the "answer_url" parameter has been received is generally of no consequence for the purposes of processing the template 400 in FIG. 4. Specifically, the template 400 contains no other line that is associated with the "answer_url" parameter. Furthermore, in this example, the entirety of the template 400 as shown in FIG. 4 is processed and the resulting web page can potentially be provided as two chunks, with a potential chunk boundary defined by the first template processing instruction associated with the "answer" parameter.

As described with reference to FIGS. 4-6, in one or more implementations, actual dynamic chunk boundaries depend on considerations involving the processing of the template 400. These considerations can include whether an input parameter is specified or unspecified when the processing reaches an expression referencing the input parameter. These considerations can also include whether or not expressions referencing the input parameter need to be evaluated (e.g., the template parameter is contained as part of a conditional expression). With each instance of the template, where each instance is associated with its own data input and results of evaluated statements, actual chunk boundaries may be different based on considerations such as those provided above.

As also described with reference to FIGS. 4-6, in one or more implementations, the element(s) and style rule(s) to be included in a chunk is associated with values for evaluated expressions. For example, if the conditional expression in line 12 evaluates to false, the "div" element spanning lines 12-15 is not included in a chunk. Similarly, the style rule(s) associated with the "div" element and any of its descendant elements need not be included in the chunk at least with respect to these elements. It is noted that other elements aside from these elements may also be associated with the same style rule(s) and may cause the style rule(s) to be included in a chunk. In one or more implementations, elements and/or style rules are sent to the web client as needed based on results from evaluated elements. In one or more implementations, therefore, style rules that are not needed based on results from evaluated elements to generate the web document do not need to be provided to the web client.

In one or more implementations, utilizing of the dynamic chunk boundaries in providing the web document can allow for more efficient transmission of the web page. The transmission of the web document is dependent on a particular template instance. The transmission can be considered more efficient in terms of amount of data that needs to be provided to the web client and time involved in the transmission.

In one or more implementations, after the entirety of the template 400 is processed, each chunk that is built and provided for transmission to the web client includes elements and style rules that are to be applied to the elements in that chunk. By providing style rules in a chunk that apply to elements within the same chunk, situations can be reduced where elements are displayed on a web page associated with the web document prior to receiving style rules associated with the elements. For example, in a case where a chunk is provided to a client device and rendered prior to receiving all style rules associated with elements in the chunk, the chunk may be displayed with certain properties of the elements in the chunk set to default values. Upon receiving additional style rules (e.g., in subsequent chunks), the display of the chunk will need to be updated and redisplayed, resulting in less efficient processing of the template and possibly lower quality of experience for a user of the client device.

In one or more implementations, dynamic chunk boundaries can be utilized in conjunction with predefined chunk boundaries. For example, a chunk can be provided for sending to the web client whenever an earlier of a dynamic chunk boundary or a defined chunk boundary is reached in document order. Furthermore, in one or more implementations, a maximum size can be imposed on a chunk, whether a chunk boundary is defined by a dynamic chunk boundary or a predefined chunk boundary. For example, a maximum size imposed on a chunk can match size of a transmission unit or packet size of an underlying network connection. In such implementations, as a chunk is built and size of the chunk reaches a set maximum prior to reaching an unspecified input parameter in a template (e.g., template 400 in FIG. 4), a chunk of the maximum size or close to the maximum size can be provided for sending to the web client.

As an example of the above discussion of FIGS. 4-6, the template 400 can be associated with a question/answer application that is provided to a user. Further, consider that a client device (e.g., 108*b* in FIG. 1) sends a request for a web document to a server (e.g., 104 in FIG. 1). Value of the "question" parameter contains the question provided/asked by the user and sent to the server along with the request. Therefore, in this and the above example, the "question" parameter is immediately available to the server. Content of the web document to be provided to the client device depends on the "question" parameter. The "answer" parameter is text generated based on the "question" parameter provided by the user and intended as an answer to the question asked by the user. The "answer_url" parameter is a link to a web page with more details concerning the question and the answer.

For each of the "answer" and "answer_url" parameters, which are not provided in the request from the user, in one or more implementations, the server can retrieve one or both parameters from memory in the server itself. In one or more implementations, the server might need to request one or both parameters from another computing device (e.g., one or more backend servers) by, for example, providing the "question" parameter to the other computing device. As an example, the server might request the "answer" parameter from another computing device, which can be the computing device that also provides the "answer_url" parameter or can be a different computing device.

A default value can be provided for the "answer" parameter and/or the "answer_url" parameter if an answer and/or a web page is not available for the question, respectively. The default value can be, for example, a set string to signify lack of an answer or a link, an empty string, and so forth. With reference to FIG. 4, the default value of "We don't know." is provided in a case that the "answer" parameter is an empty string (lines 17-19).

The template 400 also contains template processing instructions, which are instructions that reference input parameters (e.g., "question", "answer", and "answer_url"). Various lines in the template 400 contain template processing instructions, such as "<div . . . jscontent="question">" (line 10), and "<span . . . jscontent="answer"> (line 13)", and "<a jsif="answer_url !="">" (line 14), among others.

In one or more implementations, a certain latency may be involved in receiving a requested input parameter. The latency involved can be a function of, for example, network traffic (e.g., number of requests) being processed by backend servers. With reference to the example of FIG. 4, the latency can be a function of the "question" parameter itself, where an answer and/or a link associated with commonly asked questions may be more readily retrievable (e.g., faster to retrieve) than less commonly asked questions. In this example, the "question" parameter is not associated with a latency since the server receives the "question" parameter from the client device with the request.

Figure 7:
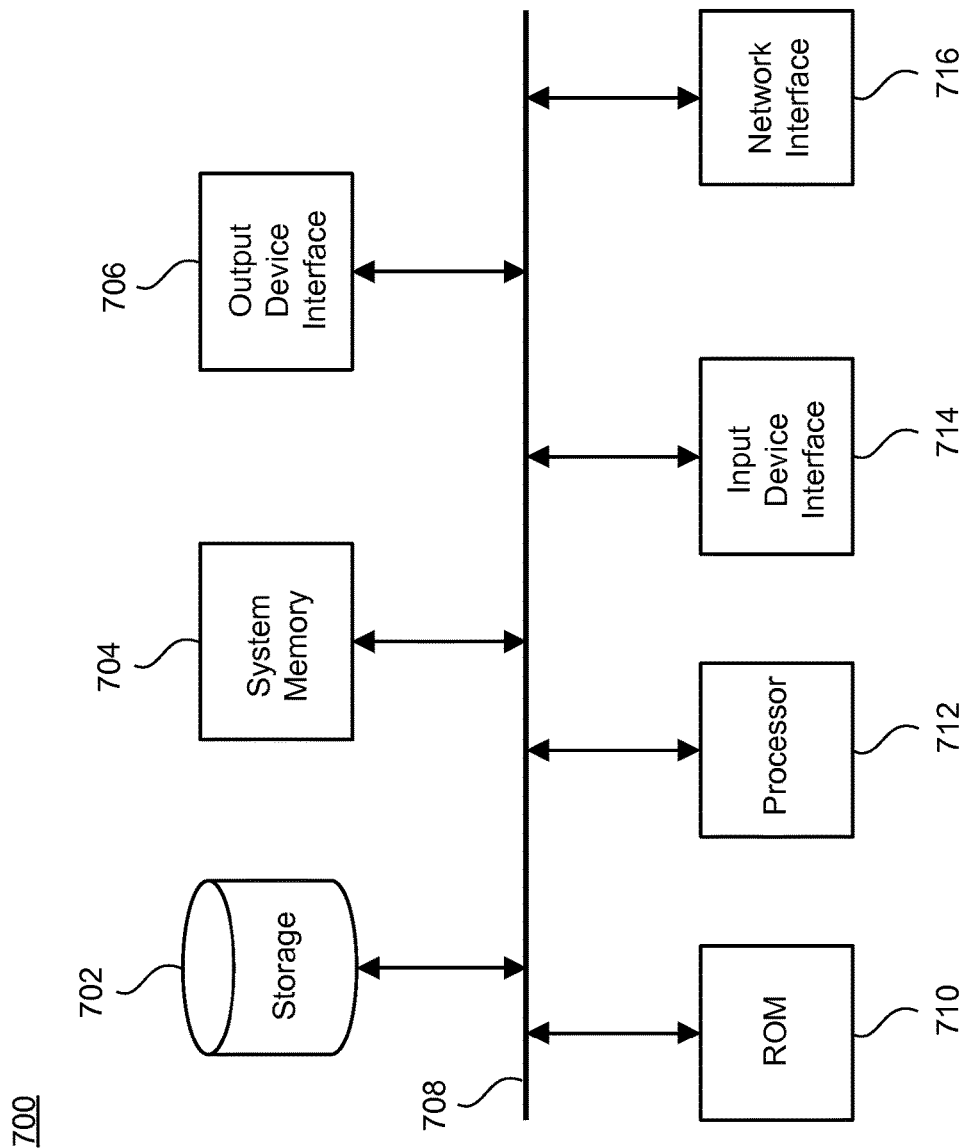
FIG. 7 conceptually illustrates an example electronic system with which some implementations of the subject technology can be implemented.

FIG. 7 conceptually illustrates an example electronic system with which some implementations of the subject technology can be implemented. Electronic system 700 can be a computer, phone, PDA, or any other sort of electronic device. Such an electronic system includes various types of computer readable media and interfaces for various other types of computer readable media. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. Some implementations of the subject disclosure use a mass-storage device (for example, a magnetic or optical disk and its corresponding disk drive) as permanent storage device 702.

Other implementations use a removable storage device (for example, a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as a random access memory. System memory 704 stores some of the instructions and data that the processor needs at runtime. In some implementations, the processes of the subject disclosure are stored in system memory 704, permanent storage device 702, or ROM 710. For example, the various memory units include instructions for chunking markup language documents containing style rules in accordance with some implementations. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the electronic system. Input devices used with input device interface 714 include, for example, alphanumeric keyboards and pointing devices (also called "cursor control devices"). Output device interfaces 706 enables, for example, the display of images generated by the electronic system 700. Output devices used with output device interface 706 include, for example, printers and display devices, for example, cathode ray tubes (CRT) or liquid crystal displays (LCD). Some implementations include devices, for example, a touchscreen that functions as both input and output devices.

Finally, as shown in FIG. 7, bus 708 also couples electronic system 700 to a network (not shown) through a network interface 716. In this manner, the computer can be a part of a network of computers (for example, a local area network (LAN), a wide area network (WAN), or an Intranet, or a network of networks, for example, the Internet. Any or all components of electronic system 700 can be used in conjunction with the subject disclosure.

Many of the above-described features and applications are implemented as software processes that are specified as a set of instructions recorded on a computer readable storage medium (also referred to as computer readable medium).

When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method, comprising:
   receiving a request for a web document;
   selecting a template for the requested web document, the template comprising a plurality of elements and a plurality of style rules for presenting the web document in a web client, wherein at least one element in the plurality of elements references a specified input parameter received with the request;
   evaluating the plurality of elements in document order;
   determining that a first element of the plurality of elements containing a first expression referencing a first unspecified input parameter has been reached, wherein the first unspecified input parameter is an input parameter that has not been received from the web client;
   stopping the evaluating in response to determining that the first element containing the first expression referencing the first unspecified input parameter has been reached;
   adding to a first set of elements, in document order, evaluated elements of the plurality of elements in the template that precede, the first element containing the first expression referencing the first unspecified input parameter and not including the first element;
   identifying a first set of style rules from the plurality of style rules, wherein each style rule in the first set of style rules is associated with at least one element in the first set of elements; and
   providing the first set of elements and the first set of style rules as a first chunk of the requested web document for sending to the web client.

2. The method of claim 1, further comprising:
   receiving the first unspecified input parameter;
   in response to receiving the first unspecified input parameter, resuming evaluating the plurality of elements in document order, starting from the first element;
   determining that a second element of the plurality of elements containing a second expression referencing a second unspecified input parameter has been reached;
   stopping the resuming evaluating in response to determining that the second element has been reached;
   adding to a second set of elements, in document order, evaluated elements of the plurality of elements in the template that start from the first element and precede the second element containing the second expression referencing the second unspecified input parameter;
   identifying a second set of style rules from the plurality of style rules, wherein each style rule in the second set of style rules is associated with at least one element in the second set of elements; and
   providing the second set of elements and the second set of style rules as a second chunk of the requested web document for sending to the web client.

3. The method of claim 2, wherein the first set of style rules is disjoint from the second set of style rules.

4. The method of claim 2, further comprising setting a flag corresponding to each style rule in the first set of style rules to a first value, wherein the style rules with a corresponding flag set to the first value are provided in the first chunk.

5. The method of claim 4, further comprising, prior to the identifying of the second set of style rules, setting the flag corresponding to each style rule in the first set of style rules from the first value to a second value, wherein the identifying of the second set of style rules comprises for each style rule in the plurality of style rules:
   determining whether the style rule has a corresponding flag set to a value different from the second value;
   if the style rule is determined to have a corresponding flag set to a value different from the second value:
      determining whether the style rule is associated with at least one element in the second set of elements; and
      adding the style rule to the second set of style rules if the style rule is determined to be associated with at least one element in the second set of elements.

6. The method of claim 2, wherein identifying the second set of style rules comprises:
   determining a third set of style rules from the plurality of style rules, wherein each style rule of the third set of style rules is associated with at least one element in the second set of elements;
   for each style rule of the third set of style rules:
      determining whether the style rule is in the first set of style rules; and
      adding the style rule to the second set of style rules when the style rule is not in the first set of style rules.

7. The method of claim 1, wherein the identifying comprises, for each style rule in the plurality of style rules:

determining whether the style rule is associated with at least one element in the first set of elements; and adding the style rule to the first set of style rules if the style rule is determined to be associated with at least one element in the first set of elements.

8. The method of claim 1, wherein for each of the plurality of elements:

evaluating the element comprises determining whether the element contains a conditional expression, and adding evaluated elements comprises adding elements containing a conditional expression evaluated as true to the first set of elements.

9. The method of claim 8, wherein the conditional expression references a specified input parameter.

10. The method of claim 1, wherein each style rule in the plurality of style rules is a Cascading Style Sheet rule.

11. The method of claim 1, wherein for each element of the plurality of elements:

evaluating the element comprises determining whether the element contains a conditional expression, and elements that contain a conditional expression evaluated as false are not added to the first set of elements.

12. A non-transitory machine-readable medium comprising instructions stored therein, which when executed by one or more processors, cause the one or more processors to perform operations comprising:

receiving a request for a web document;

selecting a template for the requested web document, the template comprising a plurality of elements and a plurality of style rules for presenting the web document in a web client, wherein at least one element in the plurality of elements references a specified input parameter received with the request;

evaluating the plurality of elements in document order;

determining that a first element of the plurality of elements containing a first expression referencing a first unspecified input parameter has been reached, wherein the first unspecified input parameter is an input parameter that has not been received from the web client;

stopping the evaluating in response to determining that the first element containing the first expression referencing the first unspecified input parameter has been reached;

adding to a first set of elements, in document order, evaluated elements of the plurality of elements in the template that precede the first element containing the first expression referencing the first unspecified input parameter and not including the first element;

identifying a first set of style rules from the plurality of style rules based on the first set of elements; and providing the first set of elements and the first set of style rules as a first chunk of the requested web document for sending to the web client.

13. The non-transitory machine-readable medium of claim 12, wherein the instructions further cause the one or more processors to perform operations further comprising:

receiving the first unspecified input parameter;

in response to receiving the first unspecified input parameter, resuming evaluating the plurality of elements in document order, starting from the first element;

determining that a second element of the plurality of elements containing a second expression referencing a second unspecified input parameter has been reached;

stopping the resuming evaluating in response to determining that the second element has been reached;

adding to a second set of elements, in document order, evaluated elements of the plurality of elements in the template that start from the first element and precede the second element containing the second expression referencing the second unspecified input parameter;

identifying a second set of style rules from the plurality of style rules based on the second set of elements; and providing the second set of elements and the second set of style rules as a second chunk of the requested web document for sending to the web client.

14. The non-transitory machine-readable medium of claim 13, wherein the instructions further cause the one or more processors to perform operations further comprising setting a flag corresponding to each style rule in the first set of style rules to a first value, wherein the style rules with a corresponding flag set to the first value are provided in the first chunk.

15. The non-transitory machine-readable medium of claim 14, wherein the instructions further cause the one or more processors to perform operations further comprising, prior to the identifying of the second set of style rules, setting the flag corresponding to each style rule in the first set of style rules from the first value to a second value, wherein the identifying of the second set of style rules comprises for each style rule in the plurality of style rules:

determining whether the style rule has a corresponding flag set to a value different from the second value;

if the style rule is determined to have a corresponding flag set to a value different from the second value:

determining whether the style rule is associated with at least one element in the second set of elements; and adding the style rule to the second set of style rules if the style rule is determined to be associated with at least one element in the second set of elements.

16. The non-transitory machine-readable medium of claim 12, wherein the identifying comprises, for each style rule in the plurality of style rules:

determining whether the style rule is associated with at least one element in the first set of elements; and adding the style rule to the first set of style rules if the style rule is determined to be associated with at least one element in the first set of elements.

17. The non-transitory machine-readable medium of claim 12, wherein for each of the plurality of elements:

evaluating the element comprises determining whether the element contains a conditional expression, and adding evaluated elements comprises adding elements containing a conditional expression evaluated as true to the first set of elements.

18. A system, comprising:

one or more processors; and a non-transitory computer-readable medium comprising instructions stored therein, which, when executed by the one or more processors, cause the one or more processors to perform operations comprising:

receiving a request for a web document;

selecting a template for the requested web document, the template comprising a plurality of elements and a plurality of style rules for presenting the web document in a web client, wherein at least one element in the plurality of elements references a specified input parameter received with the request;

evaluating the plurality of elements in document order;

stopping the evaluating upon reaching a first element of the plurality of elements containing a first expression referencing a first unspecified input parameter, wherein the first unspecified input parameter is an input parameter that has not been received from the web client;

adding to a first set of elements, in document order, evaluated elements of the plurality of elements in the template that precede the first element containing the first expression referencing the first unspecified input parameter and not including the first element;

identifying a first set of style rules from the plurality of style rules, wherein each style rule in the first set of style rules is associated with at least one element in the first set of elements; and providing the first set of elements and the first set of style rules as a first chunk of the requested web document for sending to the web client.

19. The system of claim 18, wherein the instructions, when executed by the one or more processors, cause the one or more processors to perform operations further comprising:

receiving the first unspecified input parameter;

evaluating the plurality of elements in document order, starting from the first element;

stopping the evaluating upon reaching a second element of the plurality of elements containing a second expression referencing a second unspecified input parameter;

adding to a second set of elements, in document order, evaluated elements of the plurality of elements in the template that start from the first element and precede the second element containing the second expression referencing the second unspecified input parameter;

identifying a second set of style rules from the plurality of style rules, wherein each style rule in the second set of style rules is associated with at least one element in the second set of elements; and providing the second set of elements and the second set of style rules as a second chunk of the requested web document for sending to the web client.

20. The system of claim 19, wherein the instructions, when executed by the one or more processors, cause the one or more processors to perform operations further comprising setting a flag for each style rule in the first set of style rules to a first value, wherein the style rules with a flag that is set are provided in the first chunk.

21. The system of claim 20, wherein the instructions, when executed by the one or more processors, cause the one or more processors to perform operations further comprising, prior to the identifying of the second set of style rules, setting the flag corresponding to each style rule in the first set of style rules from the first value to a second value, wherein the identifying of the second set of style rules comprises for each style rule in the plurality of style rules:

determining whether the style rule has a corresponding flag set to a value different from the second value;

if the style rule is determined to have a corresponding flag set to a value different from the second value:

determining whether the style rule is associated with at least one element in the second set of elements; and adding the style rule to the second set of style rules if the style rule is determined to be associated with at least one element in the second set of elements.

22. The system of claim 18, wherein the identifying comprises, for each style rule in the plurality of style rules:

determining whether the style rule is associated with at least one element in the first set of elements; and adding the style rule to the first set of style rules if the style rule is determined to be associated with at least one element in the first set of elements.

* * * * *